(No Model.)
F. H. LUDINGTON & F. PERCIVAL.
GRATE BAR.
No. 551,353. Patented Dec. 10, 1895.
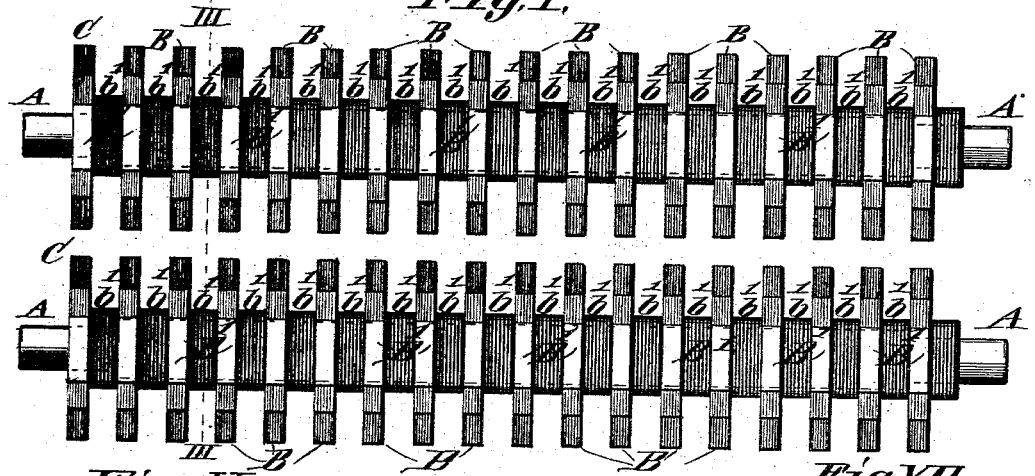
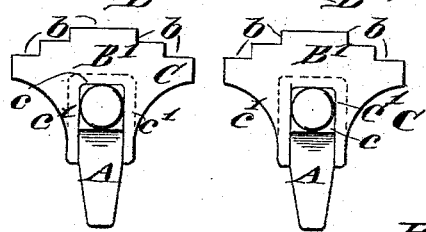
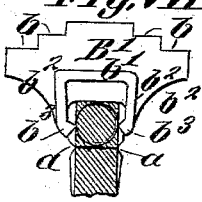
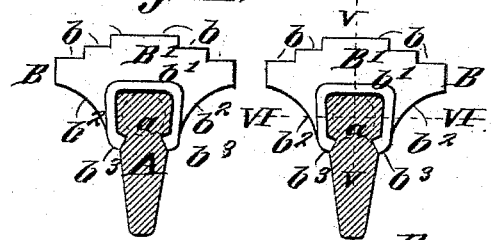
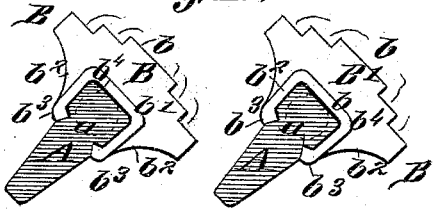
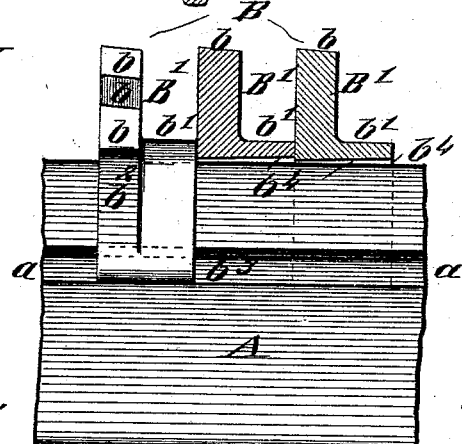
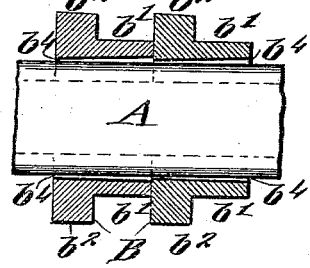
Attest:
M. F. Lier
Charles Pickles
Inventors,
Francis H. Ludington
and Frederick Percival
by their Attys.
Rex & Moody

UNITED STATES PATENT OFFICE.

FRANCIS H. LUDINGTON AND FREDERICK PERCIVAL, OF ST. LOUIS, MISSOURI.

GRATE-BAR.

SPECIFICATION forming part of Letters Patent No. 551,353, dated December 10, 1895.

Application filed March 30, 1895. Serial No. 543,898. (No model.)

*To all whom it may concern:*

Be it known that we, FRANCIS H. LUDINGTON and FREDERICK PERCIVAL, of St. Louis, Missouri, have made a new and useful Improvement in Grate-Bars, of which the following is a full, clear, and exact description.

Our improvement relates to that class of grate-bars having removable leaves strung upon the bar, and has for its chief objects, first, the protection of the bar proper from the heat of the fire to an extent sufficient to prevent warping; second, to prevent the accumulation of clinkers; third, to improve the shape of the removable leaves, and fourth, to facilitate the introduction of new leaves when the old ones become broken. We attain these objects by the mechanism illustrated in the accompanying drawings, in which—

Figure 1 represents a plan view of a pair of our improved bars arranged with reference to each other as we prefer to arrange them. Fig. 2 represents a view of those ends of the same pair of bars on which are placed what we term the "locking-leaves." Fig. 3 represents a horizontal cross-section of the same pair of bars along the line 3 3 of Fig. 1. Fig. 4 is a similar view, except that the bars are shown in an inclined position. Fig. 5 is in part a side elevation of the body of one of the bars and one of the leaves and in part a vertical longitudinal section of two leaves on the bar along the line 5 5, Fig. 3. Fig. 6 is in part a top view of the main portion of the bar and in part a horizontal longitudinal section of two leaves in place along the line 6 6, Fig. 3; and Fig. 7 is in part a vertical cross-section of the end of the bar at the point where the leaves are inserted and in part an end view of a leaf pushed down and ready to be slid into position.

Similar letters refer to similar parts throughout the several views.

A represents the bar on which the leaves are strung. Its sides preferably slope inward from top to bottom, except at one end section, as shown; but that shape is not essential. It is provided with two longitudinal grooves or rests $a$ $a$, one running along each side. We prefer not to extend it along that section of the bar A shown in cross-section in Fig. 7, and which is usually occupied by what we term the "lock-leaf."

B B, &c., are leaves which are slipped on the bar A. B' is an upwardly-projecting part upon which the fuel chiefly rests. It is preferably formed, as shown in Figs. 2, 3, and 4, with the teeth $b$ $b$ $b$ $b$ $b$, with vertical sides, and tops at right angles thereto. This form facilitates the crushing of clinkers when the bar is rocked, and is also efficient in enabling the bar to force clinkers down into the ash-pit. The special form described is not, however, essential. Other well-known forms may be substituted, as will be obvious.

We prefer to so form the fuel-support that its top and side edges slant inward toward the side of the leaf from which the flange hereinafter described extends, substantially as shown in Figs. 5 and 6. This we prefer to do regardless of whether the fuel-support is formed in other respects as shown in the drawings or not.

Each leaf B is provided with a flange $b'$ and two legs or supports $b^2$ $b^2$. Those portions of the flange $b'$ which extend out from these legs are practically parts thereof. The outer sides and top of the flange $b'$ preferably slope inward toward its outer edge. The legs $b^2$ $b^2$ inward toward its outer edge. The legs $b^2$ $b^2$ terminate in inwardly-projecting feet or lugs $b^3$ $b^3$. When the leaf is in place on the bar A, these feet rest respectively on the bottoms of the grooves $a$ $a$, as shown in Figs. 3, 4, and 5, and prevent or assist in preventing the leaf from being lifted off the bar. The opening $b^4$, which extends through each leaf B and permits it to be slid into place on the bar A, is preferably flared, and is preferably largest on the flanged side. This opening is made so large at the largest end that a space $b^4$ is left between the top and sides of the bar and the leaf B above the latter's feet $b^3$. We prefer to have an open space between the bar and leaf at the smaller end of the opening as well as its larger end, substantially as shown in Figs. 5 and 6, and the space between the top of the bar A and the leaf is preferably greater than the space between the sides of the bar and the leaf, for the reason that while the leaf, in its best form, does not rest on the top of the bar at any time, it is when in the position shown in Fig. 5, in contact with the upper side of the bar, and is thereby, to a considerable extent, supported. The feet $b^3\,b^3$ do not fit the grooves $a\,a$ tightly, but permit the leaf to have sufficient play on the bar to come in contact with and be supported by the side of the bar, either when the bar is in the position shown in Fig. 4 or when the leaf is subjected to lateral pressure or a lateral blow. The feet $b^3 b^3$ are only designed to furnish the leaf its sole support against vertical pressure, and only its sole support against pressure in that direction when the bar is in the position shown in Figs. 2, 3, and 5. Giving the leaf play on the bar tends not only to keep the spaces between the tops of the fuel-supports B' of the leaves from becoming filled with clinkers, but also tends to prevent ashes from becoming lodged between the leaf and the bar. Keeping the air-space between the leaves and the bar open tends to prevent the bar from becoming overheated and warping.

In placing the leaves B on the bar they are arranged as shown in Figs. 1, 5, and 6, with an unflanged side of one leaf next the flanged side of another. The flanges not only separate the fuel-supports B' so as to leave air-spaces between them, but add strength to the leaves and assist in protecting the bar A.

C C are leaves which differ from the leaves B in several respects. They are intended to be removable by an upward pressure, and to be placed on that portion of the bar shown in cross-section in Fig. 7. We do not lock them in place as we do not consider it necessary. It may be done if desired. The opening $c$ between the legs $c'\,c'$ should preferably be of a size to fit the bar tightly, and the leaf rests directly upon the top of the bar, as shown in Fig. 2. The leaves C are not provided with feet. Their preferred form is shown in Fig. 2. As will be obvious, the form may be modified in many ways, the essential point with reference to this leaf C being merely that it shall be so formed that it can be taken off the bar vertically, without any lateral movement. As will be obvious, the bar may, if desired, be made in cross-section, as shown in Fig. 3, from end to end, and the leaf C omitted. When the preferred form of bar is used and one of the leaves B becomes broken, all that is necessary is to knock the broken leaf off the bar and push the remaining leaves together, leaving a space for a new leaf next the leaf C. The leaf C is then removed, a leaf B dropped down on the bar on the end section and pushed inward, so as to cause its feet to rest in the grooves $a\,a$, and the leaf C replaced.

Our improved bar is especially useful as a rocking-bar, and where it is used as such we prefer to so arrange the rocking mechanism as to rock all the bars in the same direction, as illustrated in Fig. 4. We have designed no new form of rocking mechanism and have therefore shown none. Any well-known rocking device may be used.

We claim—

1. The combination of a bar having longitudinal grooves running along each side, and a series of leaves with downwardly extending legs and inwardly extending feet, said feet entering said grooves and resting upon the bottoms thereof, and supporting said leaves and preventing said leaves from being removed by lifting them directly upward when in position, substantially as described.

2. The combination of a bar having a longitudinal groove running along each side, and a series of leaves, each having an opening through it permitting it to be slipped into place on said bar, and each having on each side, a downwardly extending leg, provided with an inwardly projecting foot, extending into and resting within one of said grooves in said bar, and supporting the leaf when in a vertical position, and keeping it out of contact with the top of the bar, substantially as described.

3. The combination of a bar having a longitudinal groove running along each side, and a series of leaves each having an opening through it permitting it to be slipped into place on said bar, and each having on each side, a downwardly extending leg, provided with an inwardly projecting foot, extending into and resting within one of said grooves, and supporting said leaf when in a vertical position and preventing its being lifted directly off the bar when in position, while allowing longitudinal movement on the bar, and said leaves having lateral play on the bar, and being kept out of contact with its top, substantially as described.

FRANCIS H. LUDINGTON.
FREDERICK PERCIVAL.

Witnesses:
HENRY L. CHASE,
WM. RANDOLPH.